United States Patent Office 3,382,082
Patented May 7, 1968

3,382,082
FOAMED-IN-PLACE CERAMIC REFRACTORY
INSULATING MATERIAL
Alfred G. Eubanks, Kensington, and Ronald E. Hunkeler,
Lanham, Md., assignors to the United States of America as represented by the Administrator of the National
Aeronautics and Space Administration
No Drawing. Filed Aug. 28, 1964, Ser. No. 392,965
22 Claims. (Cl. 106—40)

ABSTRACT OF THE DISCLOSURE

Foamed-in-place ceramic refractory composition and method for making same. The composition comprises the following ingredients: powdered aluminum hydroxide, phosphoric acid, bentonite, powdered aluminum phosphate, and a metal powder above hydrogen in the electrochemical series. It also can include powdered silicon dioxide. In the process all specified quantities of the above named ingredients, except for the phosphoric acid, are thoroughly mixed. Then the phosphoric acid is added and the total mixture stirred until a slurry is formed. The slurry is poured into a container which houses an object to be potted or not as the case may be and thereafter the slurry is allowed to stand until it has foamed sufficiently to fill the container. Finally, the container is placed in an oven and the foamed slurry is cured at the relatively low temperatures of from 65 to 100 degrees centigrade.

---

The invention described herein may be manufactured and used by and for the Government of the United States of America for governmental purposes without the payment of any royalties thereon or therefor.

The present invention relates to a new ceramic composition and the method for producing same, and more particularly, to the composition and method of producing a low-temperature cured foamed-in-place porous ceramic refractory insulating material.

It is essential when certain objects, particularly electrical components, are subjected to high temperature environmental conditions, that they be thermally protected. It is also a requirement, in many instances, that these objects be provided with mechanical support for protection against vibration. These objectives are generally accomplished by the use of a potting compound which is cured about the components to be protected. The known present day potting compositions, while providing vibrational shielding, do not sufficiently protect the potted objects when they are subjected to extreme temperature conditions. For example, electronic components located on a spacecraft, leaving and/or re-entering the earth's atmosphere, may be subject to extremely high temperatures from which they must be protected. The composition of the present invention provides a pottable material which has excellent thermal insulation properties and which can be used also as a vibrational support for the components to be protected.

While many prior art refractory materials are known to have excellent thermal properties, electrical components can not be potted directly therein for the reason that the extremely high temperature required in carrying out the curing portion of the potting process would damage or entirely destroy the components due to the intense heat. Instead, separately prepared refractory blocks of various shapes had to be processed at a temperature in the range of 500 degrees Fahrenheit or above. The produced blocks then had to be fitted about the objects to be protected. Such prior art techniques had the obvious disadvantages of requiring long time and high temperature processing, costly equipment and labor to locate the refractory blocks about the objects to be protected, and a considerable consumption of time to assemble the final structure. In addition, by the curing taking a day or more for completion, the total process was extremely slow and tied up valuable space and equipment.

By the particular composition and process for producing same, both of which will be described in detail hereinafter, electrical components can very simply and inexpensively be potted, without being damaged in the curing step, in a foamed-in-place refractory insulating material. Further, it has been found that this composition can serve equally as well as a thermal insulation having many other uses, such as, in furnaces, for example, and can also find many uses in the construction art as a low cost, easily workable insulating material.

Accordingly, it is an object of the present invention to provide foamed-in-place ceramic refractory insulating materials having improved properties and being produced at low temperatures in relatively short periods of time.

It is another object of the present invention to provide a potting material capable of encasing an object and thermally protecting it to temperatures of approximately 3000 degrees Fahrenheit.

It is still another object of the present invention to provide a new and improved foamed-in-place ceramic material.

It is still a further object of the present invention to provide a method for forming foamed-in-place refractory ceramic high temperature insulation materials requiring a relatively low curing temperature.

These and other objects are attained by the present invention which is a novel porous ceramic composition comprising the following ingredients: powdered aluminum hydroxide [$Al(OH)_3$]; phophoric acid, e.g., orthophosphoric acid ($H_3PO_4$); bentonite; powdered aluminum phosphate, e.g., aluminum ortho-phosphate ($AlPO_4$); powdered silicon dioxide ($SiO_2$); and a metal powder such as aluminum (Al). The invention further includes the process of forming the composition itself by thoroughly mixing in a container specified quantities, defined more specifically hereinafter, of aluminum hydroxide, bentonite, aluminum ortho-phosphate, silicon dioxide, and aluminum powder; adding ortho-phosphoric acid to the resulting mixture; and vigorously stirring the contents of the container until a slurry is formed. This slurry is poured or transferred into a lubricated enclosure which provides the shape of the final material or which contains the object to be potted by the foamed ceramic. The enclosure, with the slurry, is allowed to stand at room temperature, for a short time, until the slurry has foamed sufficiently to fill the enclosure. Finally, the enclosure is placed in an oven and the foamed slurry is cured at 65 to 100 degrees centigrade. The curing time required varies from 2 to 24 hours, depending upon the volume, density and curing temperature utilized.

To provide those skilled in the art with a better understanding of the invention, Table I lists the ingredients in percent (%) by weight and particle size of the composition of the foamed-in-place ceramic refractory material.

TABLE I

| Ingredients | Percent by Weight | Particle Size |
|---|---|---|
| Phosphoric acid ($H_3PO_4$) (85%) | 39 to 60 | |
| Aluminum hydroxide [$Al(OH)_3 \cdot nH_2O$] | 10 to 55 | Best results with 325 mesh or smaller; however, 20% can be up to 200 mesh. |
| Total of phosphoric acid and aluminum hydroxide must fall within the approximate range. | 50 to 95 | |
| Metal powder above hydrogen in the electrochemical series. | 0.1 to 0.5 | 80 mesh or smaller; best results with approximately 15±5 microns. |
| Bentonite | 0.7 to 4 | 325 mesh or smaller. |
| Silicon dioxide ($SiO_2$) | 0 to 5 | 10 to 20 millimicrons. |
| Aluminum phosphate ($AlPO_4$) | Quantity necessary to bring the percent by weight of the mixture up to 100%. | 150 mesh or smaller. |

While Table I indicates that the percent by weight of the ingredients can be varied, it should be noted, as pointed out therein, that the total percent by weight of the phosphoric acid and aluminum hydroxide must be within the range of approximately 50 to 95 percent by weight. A detailed analysis of the combination of the ingredients in this table, to form the foamed ceramic composition, will be presented hereinafter.

First, however, a complete description of the steps for processing the novel foamed-in-place ceramic refractory insulating material is now presented.

Mixing.—The dry ingredients of aluminum hydroxide, bentonite, aluminum phosphate (e.g., aluminum orthophosphate), silicon dioxide and a metal powder (e.g., aluminum powder) are stirred together in a container at room temperature to form a blend to which is added the phosphoric acid (e.g., ortho-phosphoric acid). The mixture is vigorously stirred at room temperature for approximately two (2) minutes at which time a chemical reaction, as defined hereinbelow, takes place. Water that is formed as a result of this chemical reaction reduces the viscosity of the mixture to a slurry having a consistency generally that of a pancake batter.

Forming.—The slurry, as prepared, is poured into a lubricated mold (a lubricant such as silicone oil can be used) containing the object to be potted, or, if potting is not desired, but, instead, the material is to be made to have a particular shape, an empty mold, and allowed to stand at room temperature from zero to approximately thirty (30) minutes, or until the slurry has foamed sufficiently to nearly fill the mold. The foaming is due, in the main, to the metal powder—ortho-phosphoric acid reaction. The mineral bentonite acts as a stabilizer to control and regulate the foam pore structure. While a cover for the mold is not absolutely essential, it is suggested that one be used to prevent possible overflow and to enhance the uniformity of the pore structure of the composition. It was found that a tight fitting cover on the mold will yield a better, more uniform density composition. It should be noted that the slurry foams at a rate similar to the reaction of yeast in the formation of bread.

Curing.—The foamed slurry, still in the mold, is next cured by heating at a temperature between approximately 65 and 100 degrees centigrade for about 24 hours or less depending on the curing temperature selected from the above range and the volume of the mold—approximately 8 hours being the usual time for a foamed ceramic formed in a mold, the size thereof approximating the dimensions of a common building brick, being cured at 85 degrees centigrade and a shorter time, such as two hours, being usual for 100 degrees centigrade. The curing time is also dependent upon the amount of water of hydration which must be eliminated during curing, the volume and complexity of the mold, and whether the mold remains covered during the entire curing period. It has been noted that by uncovering the mold after about one hour of curing the total curing time can be reduced.

In the process, just outlined above, the forming of the slurry during the mixing step occurs principally due to the chemical reactions between the aluminum hydroxide and the ortho-phosphoric acid as follows:

$$3H_3PO_4 + Al(OH)_3 \rightarrow Al(H_2PO_4)_3 + 3H_2O \quad (1)$$

$$3H_3PO_4 + 2Al(OH)_3 \rightarrow Al_2(HPO_4)_3 + 6H_2O \quad (2)$$

$$H_3PO_4 + Al(OH)_3 \rightarrow AlPO_4 + 3H_2O \quad (3)$$

Where the reactions given by Equation 1 will always occur; while those given by Equations 2 and 3 may or may not occur to a significant degree depending on whether a sufficient amount of $Al(OH)_3$ remains from reaction 1.

During the forming step, a foaming reaction occurs between the aluminum metal powder and the ortho-phosphoric acid to liberate hydrogen gas as given by the following equation:

$$2Al + 2H_3PO_4 \rightarrow 2AlPO_4 + 3H_2\uparrow \quad (4)$$

By observing the above equations it can be seen that there are limits placed upon the amounts of ortho-phosphoric acid and aluminum hydroxide that can be incorporated in the mixture for it to produce a composition within the teaching of the invention. The limits in percent by weight for ortho-phosphoric acid (85% concentration) and the aluminum hydroxide to make the foamed ceramic can be varied from approximately 39 percent to approximately 60 percent by weight and from approximately 10 to approximately 55 percent by weight, respectively. However, at the same time the sum of the percent by weight of the ortho-phosphoric acid and aluminum hydroxide should total between approximately 50 and 95 percent by weight.

The composition includes, in addition to the aluminum hydroxide and ortho-phophoric acid, the following ingredients: metal powder, from 0.1 to 0.5 percent by weight; bentonite, from 0.7 to 4 percent by weight; ultrafine silicon dioxide powder (on the order of 10 to 20 millimicrons), from 0 to 5 percent by weight; and enough aluminum phosphate, e.g., aluminum ortho-phosphate, to complete 100 percent by weight of the composition. These ingredients, it is believed, enhance the curing step by contributing to the strength of the final composition. The bentonite, in addition, primarily acts as a foam stabilizer in the forming step.

While the ortho-phosphoric acid mentioned above is indicated as having a concentration of 85%, this percentage may be lowered slightly and can be increased up to 100%. Where only a highly concentrated ortho-phosphoric acid is available and it is desired that an 85% ortho-phosphoric acid be used in the preparation of the foamed composition, then sufficient water should be added either directly to the acid itself or to the dry ingredients prior to adding the acid thereto.

In carrying out the invention, the aluminum hydroxide can be either anhydrous or hydrous. Accordingly, standard commercially available aluminum hydroxide, which usually contains an unknown quantity of chemically combined water and which has the chemical formula, $Al(OH)_3 \cdot nH_2O$, is readily adaptable for use in the processing of the foamed ceramic refractory material. In either case, best results are attained when the particle size thereof is smaller than approximately 325 mesh. Up to 20 percent of the particles can be coarser and still be tolerated. However, these coarser particles should not be larger than about 200 mesh.

Although aluminum is the preferred metal powder used to bring about the foaming reaction, other metals above hydrogen in the electro-chemical series, such as, for example zinc and/or tin will serve in the same fashion. Finely divided powder of about 15±5 microns gives excellent results. However, particles as coarse as 80 mesh (177 microns) are usable. Commercially available powdered aluminum paint pigment has been found to be suitable.

The bentonite, forming part of the composition, is of extremely small particle size (smaller than 325 mesh) and serves in the process as a foam stabilizer to bring about an even distribution of the bubbles in the foam. It also provides, by a sintering action, improved high temperature strength characteristics when and if the foam is used in service above about 2000 degrees Fahrenheit.

For best results the aluminum ortho-phosphate particles should be 150 mesh (105 microns) or smaller in diameter and the ultra-fine silicon dioxide should be on the order of 10 to 20 millimicrons. It should be noted that these last two ingredients may be omitted if a lower strength composition could be tolerated in a desired application.

While generally the consistency of the slurry is like a pancake batter, at the lower limits of phosphoric acid content of the composition, the slurry is more viscous and takes on a putty-like consistency. In this condition the slurry is difficult to pour but can be transferred into the mold with a spatula.

It has been found that compositions formed having a lower acid content than that listed as the lower limit in Table I result in high viscosity mixtures which cannot be poured. In some applications these high viscosity mixtures can be used as troweled-on insulating coatings. While the composition ranges presented in Table I above indicate that the sum of the ortho-phosphoric acid and the aluminum hydroxide can be varied between 50 to 95 percent by weight, the preferred compositions have sums of about 87 percent by weight with the ratio of ortho-phosphoric acid to aluminum hydroxide being approximately 1 to 1.

The following tables (Tables II, III and IV) provide data of sample mixes falling within the relationship referred to hereinabove and are given by the way of illustration only and not by the way of limitation, of the preferred compositions of the foamed-in-place ceramic refractory material. The particle size of the ingredients as listed in Table II, applies equally as well to Tables III and IV.

TABLE II.—SAMPLE MIX A

| Ingredients | Weight (grams) | Percent by Weight |
|---|---|---|
| Ortho-phosphoric acid (85%) | 31.00 | 44.38 |
| Aluminum hydroxide (smaller than 200 mesh) | 30.00 | 42.95 |
| Bentonite (smaller than 325 mesh) | 1.00 | 1.43 |
| Aluminum phosphate (smaller than 200 mesh) | 6.50 | 9.31 |
| Silicon dioxide powder (particle size of 10 to 20 millimicrons) | 1.20 | 1.72 |
| Aluminum metal powder (15±5 micron diameter particles) | 0.15 | .21 |
| Total | | 100.00 |

TABLE III.—SAMPLE MIX B

| Ingredients | Weight (grams) | Percent by Weight |
|---|---|---|
| Ortho-phosphoric acid (85%) | 30.00 | 49.84 |
| Aluminum hydroxide | 25.00 | 41.60 |
| Bentonite | 1.00 | 1.66 |
| Aluminum orthophosphate | 4.00 | 6.65 |
| Aluminum powder | 0.15 | 0.25 |
| Total | | 100.00 |

TABLE IV.—SAMPLE MIX C

| Ingredients | Weight (grams) | Percent by Weight |
|---|---|---|
| Ortho-phosphoric acid (85%) | 40.00 | 39.85 |
| Aluminum hydroxide | 28.00 | 27.91 |
| Bentonite | 2.00 | 1.99 |
| Aluminum ortho-phosphate | 30.00 | 29.95 |
| Aluminum powder | 0.30 | 0.30 |
| Total | | 100.00 |

It should be noted that Sample Mixes B and C, Tables III and IV, respectively, do not include the ingredient silicon dioxide ($SiO_2$). The inclusion of $SiO_2$ in the mixture is not absolutely essential, its use in the composition, however, increases the strength thereof as previously mentioned.

Referring now to Sample Mix A (Table II), an explanation will be presented as to how the composition outlined therein meets the test for determining the amounts of the principal ingredients thereof spelled out in more detail hereinabove and summarized in Table I. The summation of the percent by weight of the ortho-phosphoric acid and the aluminum hydroxide $$(44.38 + 42.95 = 87.33)$$

meets the criteria previously set out above. This same analysis applies equally as well to Sample Mixes B and C, outlined in Tables III and IV, respectively. The other ingredients forming the ceramic compositions of Sample Mixes A, B, and C all fall within the limits prescribed hereinabove.

Whereas the three sample mixes are given with no regard to the density of the ceramic material formed, the density thereof can be readily predicted or selected within the range of from approximately 20 pounds per cubic foot to 120 pounds per cubic foot by any one or a combination of the three methods outlined hereinbelow.

Method 1.—The easiest method, and the most frequently used, is to pour pre-determined amounts of slurry into a given volume. The surrounding walls of the mold tend to constrain the foaming action so that the ceramic material is formed with smaller cell structure and higher density.

Method 2.—The density may be controlled by varying the particle size of the metallic powder added to the mixture. Large size particles, however, that is, above about 50 mesh, tend to create large bubbles in the foam causing it to have a rather irregular cell structure.

Method 3.—By varying the amount of metallic powder added to the mixture, the density can also be regulated.

While no definitive data is available on the latter two methods, each has been practiced and has proven satisfactory. In regard to Method 1, the weight of the slurry required per cubic inch of volume is shown in Table V as a function of desired density (pounds per cubic foot).

TABLE V

| Density of Cured Ceramic Material | | Density of Slurry Prior to Curing |
|---|---|---|
| Column A, pounds/ cubic foot | Column B, grams/ cubic inch | Column C, grams/ cubic inch |
| 20 | 5.3 | 6.0 |
| 30 | 7.9 | 8.9 |
| 40 | 10.5 | 11.8 |
| 50 | 13.1 | 14.7 |
| 60 | 15.8 | 17.6 |
| 70 | 18.4 | 20.6 |
| 80 | 21.0 | 23.5 |
| 90 | 23.6 | 26.4 |

In this table, Column C gives the density (weight/unit volume) of slurry before curing and Columns A and B provide the resultant density (weight/unit volume in different units) after curing. The difference between the corresponding values of Columns B and C, for a particular density value of Column A, represents the weight of water per cubic inch which must be eliminated from the slurry during the curing step of the process. The data from this table was obtained by using Sample Mix A (Table II) in a manner more fully described hereinbelow.

The first step in preparing a foam of desired density, by using Method 1, is to calculate the interior volume of the mold to be used. Since, for the most part, it is desired that a material be formed having a uniform density, the mold itself should be designed to be rigid. Once the interior volume of the mold is known the weight of the slurry per cubic inch required to make a specific density composition can be extrapolated from Column C of Table V. The next step is to calculate, by direct proportion, the exact amount of each ingredient required by using as a basis the data for a typical mixture, for instance, Sample Mix A disclosed in Table II. This is illustrated by the following examples:

Example 1

To fill a 12-cubic inch mold with the foamed ceramic material having a density, when cured, of approximately *50 pounds per cubic foot,* it is determined from Column C of Table V that 14.7 grams per cubic inch or a total of 176.4 grams (14.7 grams per cubic inch × 12 cubic inches=176.4 grams) of slurry is required.

The calculated quantities for each ingredient are as follows:

TABLE VI

| Ingredient | Typical Mixture, Percent by Weight | Weight of Ingredient (grams) |
|---|---|---|
| Ortho-phosphoric acid | 44.38 | 78.29 |
| Aluminum hydroxide | 42.95 | 75.77 |
| Bentonite | 1.43 | 2.52 |
| Aluminum ortho-phosphate | 9.31 | 16.42 |
| Silicon dioxide | 1.72 | 3.03 |
| Aluminum metal powder | 0.21 | 0.37 |
| Total weight of slurry | | 176.4 |

Example 2

To fill a 12-cubic inch mold with the foamed ceramic material having a density, when cured, of approximately *20 pounds per cubic foot,* it is determined from Column C of Table V that 6.0 grams per cubic inch or a total of 72 grams of slurry is required.

The calculated quantities for each ingredient are as follows:

TABLE VII

| Ingredient | Typical Mixture, Percent by Weight | Weight of Ingredient (grams) |
|---|---|---|
| Ortho-phosphoric acid | 44.38 | 31.96 |
| Aluminum hydroxide | 42.95 | 30.93 |
| Bentonite | 1.43 | 1.02 |
| Aluminum ortho-phosphate | 9.31 | 6.70 |
| Silicon dioxide | 1.72 | 1.24 |
| Aluminum metal powder | 0.21 | 0.15 |
| Total weight of slurry | | 72.00 |

Example 3

To fill a 12-cubic inch mold with the foamed ceramic material having a density, when cured, of approximately *90 pounds per cubic foot,* it is determined from Column C of Table V that 26.4 grams per cubic inch or a total of 316.8 grams of slurry is required.

The calculated quantities for each ingredient are as follows:

TABLE VIII

| Ingredient | Typical Mixture, Percent by Weight | Weight of Ingredient (grams) |
|---|---|---|
| Ortho-phosphoric acid | 44.38 | 140.59 |
| Aluminum hydroxide | 42.95 | 136.09 |
| Bentonite | 1.43 | 4.53 |
| Aluminum ortho-phosphate | 9.31 | 29.49 |
| Silicon dioxide | 1.72 | 5.44 |
| Aluminum metal powder | 0.21 | 0.66 |
| Total weight of slurry | | 316.80 |

It should be noted that in the examples given above in Tables VI, VII and VIII the exact amount of slurry required to give the desired densities for the 12-cubic inch mold was calculated. As a practical matter, however, these calculated quantities of slurry must be increased by approximately 5%, or enough to compensate for the loss of slurry incurred due to the normal adherence thereof to the mixing container. One means for compensating for this loss of slurry has been to increase the weight of each of the ingredients by approximately 10% over the amounts given above in the tables so that the total quantity of slurry will be increased by 10%. Then even though some slurry will adhere to the mixing container there will be a sufficient amount available so that the precise weight of slurry can be poured into the mold. By first weighing the mold and then pouring the slurry into the mold, with the mold on a scale, the exact quantity of slurry in the mold can be readily measured.

While Table V and Examples 1, 2 and 3 presented in Tables VI, VII and VIII, respectively, were all derived using Sample Mix A (Table II) as a basis, the discussion relating to them applies equally as well to the use of other mixes as long as they fall within the limits set out in Table I above. Once a sample mix is derived all that is necessary for it to be used in producing a ceramic having a desired density is that a slurry thereof be made and a predetermined quantity (weight/unit volume) thereof be poured into a mold of a known volume. This step should be repeated a number of times except that in each case the quantity (weight/unit volume) of the slurry poured into the mold should be different. In each instance, after the slurry is poured into the mold, the mold is covered with a tight fitting cover to prevent an overflow of the slurry and to achieve an accurate control of density of the resulting composition. Since the mold is of a known volume, the weight/unit volume of the slurry is known and the density of the cured ceramic material can be easily calculated, a table similar to Table V above can be made. By the use, as described hereinabove, of such a table the density of the particular sample mix can be readily selected. This discussion applies equally as well as to any sample mix.

While Method 1 is particularly applicable in obtaining densities from 20 pounds per cubic foot to 90 pounds per cubic foot, should densities of above 90 pounds per cubic foot and up to approximately 120 pounds per cubic foot be desired, they can be obtained as described by Method 3 by reducing the metal powder content of the typical mixture selected as a basis.

It is to be understod that volumes smaller or larger than 12 cubic inches may be prepared by appropriately calculating the amounts of each constituent following the procedure described in connection with Tables VI, VII and VIII.

In addition to having the qualities outlined above and being simple to produce, the ceramic material described herein is susceptible to many machine shop practices. For example, it can be cut with a hacksaw, shaped with a wood rasp, bored with an ordinary drill bit and ground with an abrasive wheel. The texture and shape of the surface or surfaces of the material can be varied from very rough to highly glossy by appropriately choosing the interior mold surface; for example, a smooth curved surface is obtained by foaming the material against a watch glass that has been lightly coated with a lubricant and placed in the bottom of the mold. Such a surface, if say constructed in a parabolic shape would be an ideal infrared or heat reflector as well as an insulator.

The ceramic material of the instant invention possesses the following added advantages: it adheres conveniently to some metals, such as aluminum and galvanized steel, and is susceptible to color additives. To adhere to other metals or materials it may be necessary to use a high temperature adhesive.

Small percentages of ceramic coloring materials (chromium oxide for green, manganese oxide for grey, etc.) can be added to the basic mixture to produce a permanent insoluble coloring effect. The following examples given in Tables IX and X below, using Sample Mix A (Table II) as a basis, with a minor variation to allow for the addition of the color additives, are typical of a green-colored and grey-colored foam ceramic, respectively:

TABLE IX

| Ingredient | Percent by Weight | Weight of Ingredient (grams) |
| --- | --- | --- |
| Ortho-phosphoric acid | 44.08 | 31 |
| Aluminum hydroxide | 42.66 | 30 |
| Bentonite | 1.42 | 1 |
| Aluminum ortho-phosphate | 9.23 | 6.5 |
| Silicon dioxide | 1.71 | 1.2 |
| Aluminum powder | 0.21 | 0.15 |
| Chromium oxide ($Cr_2O_3$) (less than 325 mesh) | 0.71 | 0.5 |

TABLE X

| Ingredient | Percent by Weight | Weight of Ingredient (grams) |
| --- | --- | --- |
| Ortho-phosphoric acid | 43.20 | 31 |
| Aluminum hydroxide | 41.79 | 30 |
| Bentonite | 1.39 | 1 |
| Aluminum ortho-phosphate | 8.96 | 6.5 |
| Silicon dioxide | 1.68 | 1.2 |
| Aluminum powder | 0.20 | 0.15 |
| Manganese dioxide ($MnO_2$) (less than 200 mesh) | 2.78 | 2.0 |

While the primary use of the instant invention is for foamed-in-place refractory potting materials, it may also find application, because of its unique characteristics and ease of preparation, as a building and insulation material. In this respect, due to its thermal insulating properties, it has been used as an enclosure for a high intensity light source for a cryogenic environment to prevent heat generated from the light source from passing through the enclosure into the cryogenic environment.

Although the foregoing disclosure relates to preferred embodiments of the invention, it is obvious that numerous modifications and alterations may be made therein without departing from the spirit and scope of the invention set forth in the appended claims.

What is claimed is:

1. A composition for producing a foamed-in-place ceramic refractory insulating material, the composition consisting essentially of: phosphoric acid of 39 to 60 percent by weight; aluminum hydroxide of 10 to 55 percent by weight, the total of said phosphoric acid and said aluminum hydroxide being 50 percent to 95 percent by weight; a metal powder above hydrogen in the electrochemical series of 0.1 to 0.5 percent by weight; bentonite of 0.7 to 4 percent by weight and aluminum phosphate of quantity sufficient to bring the percent by weight of the composition up to about 100 percent.

2. The composition of claim 1 further including silicon dioxide of up to 5 percent by weight.

3. The composition of claim 2 wherein said phosphoric acid is 85% concentrated, said aluminum hydroxide is of particle size of 325 mesh or smaller, said metal powder is of particle size of 80 mesh or smaller, said bentonite is of particle size of 325 mesh or smaller, said aluminum phosphate is of particle size of 150 mesh or smaller and said silicon dioxide is of particle size of 10 to 20 millimicrons.

4. The composition of claim 3 wherein said metal powder is aluminum, said phosphoric acid is ortho-phosphoric acid and said aluminum phosphate is aluminum ortho-phosphate.

5. A composition for producing a foamed ceramic refractory insulating material consisting essentially of ortho-phosphoric acid of approximately 85% concentration and approximately 44.38 percent by weight; aluminum hydroxide smaller than 200 mesh in particle size and approximately 42.95 percent by weight; bentonite smaller than 325 mesh in particle size and approximately 1.43 percent by weight; aluminum ortho-phosphate smaller than 200 mesh in particle size and approximately 9.31 percent by weight, silicon dioxide powder of 10 to 20 millimicrons in particle size and 1.72 percent by weight; and aluminum powder of 15±5 micron diameter particle size and .21 percent by weight.

6. A method of preparing a foamed-in-place ceramic refractory insulating material comprising the steps of: adding 39 to 60 percent by weight of phosphoric acid to a mixture of ingredients of 10 to 55 percent by weight of aluminum hydroxide, 0.7 to 4 percent by weight of bentonite, 0.1 to 0.5 percent by weight of a metal powder above hydrogen in the electrochemical series, and a percent by weight of aluminum phosphate to bring the percent by weight of the mixture up to about 100 percent, said ingredients being of small particle size; stirring said acid mixture to form a slurry; transferring said slurry into a mold wherein it foams; curing said foamed slurry at a temperature between approximately 65 to 100 degrees centigrade until said slurry is cured.

7. A method of preparing a foamed-in-place ceramic refractory insulating material comprising the steps of: intimately mixing together small size particles of 10 to 55 percent by weight of aluminum hydroxide, 0.7 to 4 percent by weight of bentonite, 6 to 30 percent by weight of aluminum phosphate and 0.1 to 0.5 percent by weight of a metal powder above hydrogen in the electrochemical series to form a blend, adding 39 to 60 percent by weight of phosphoric acid to said blend, vigorously stirring said acid mixture at room temperature until a chemical reaction takes place in which a slurry is formed; transferring said slurry into a lubricated mold; keeping said slurry containing mold at room temperature until it has foamed sufficiently to nearly fill said mold; and curing said foamed slurry at temperature of approximately 65 degrees centigrade or higher until said slurry is cured.

8. The method of claim 7 further including the addition to said blend of small size particles of up to 5 percent by weight of silicon dioxide.

9. A method of preparing a ceramic refractory insulating material comprising the steps of: adding 39 to 60 percent by weight of phosphoric acid to a mixture of 10 to 55 percent by weight of aluminum hydroxide of particle size of approximately 325 mesh or smaller, 0.7 to 4 percent by weight of bentonite of particle size of approximately 325 mesh or smaller, 0.1 to 0.5 percent by weight of a metal powder above hydrogen in the electrochemical series and of particle size of approximately 80 mesh or smaller, and a percent by weight of aluminum phosphate of particle size of 150 mesh or smaller sufficient to bring the percent by weight of the mixture up to about 100 percent; stirring said acid mixture to form a slurry; transferring said slurry into a lubricated mold; keeping said slurry containing mold at room temperature until it has foamed sufficiently to nearly fill said mold; and curing said foamed slurry at a temperature between approximately 65 and 100 degrees centigrade until said slurry is cured.

10. The method of claim 9 further including in said mixture up to 5 percent by weight of silicon dioxide of particle size of 10 to 20 millimicrons.

11. A method of preparing a refractory ceramic insulating material comprising the steps of: adding 39 to 60 percent by weight of phosphoric acid to a mixture of 10 to 55 percent by weight of aluminum hydroxide of particle size of approximately 325 mesh or smaller, 0.7 to 4 percent by weight of bentonite of particle size of approximately 325 mesh or smaller, 0.1 to 0.5 percent by weight of powdered aluminum of particle size of approximately 15±5 microns, up to 5 percent by weight of silicon dioxide of particle size of approximately 10 to 20 millimicrons, and aluminum phosphate of particle size of 150 mesh or smaller sufficient to bring the percent by weight of the mixture up to 100 percent; stirring said acid mixture to form a slurry; transferring said slurry into a lubricated mold; keeping said slurry containing mold at room temperature until it has foamed sufficiently to nearly fill said mold; and curing said foamed slurry at a temperature between approximately 65 and 100 degrees centigrade for 24 hours or less depending on the curing selected from the above range and the volume of said mold.

12. The method of claim 11 wherein said phosphoric acid and said aluminum hydroxide have a total percent by weight of 50 to 95 percent.

13. The method of claim 12 wherein said phosphoric acid is ortho-phosphoric acid 85% concentrated and said aluminum phosphate is aluminum ortho-phosphate.

14. A method of preparing a foamed ceramic refractory insulating material comprising the steps of: adding approximately 44.38 percent by weight of 85% ortho-phosphoric acid to a mixture of approximately 42.95 percent by weight of aluminum hydroxide smaller than 200 mesh particle size, approximately 1.43 percent by weight of bentonite smaller than 325 mesh in particle size, approximately 9.31 percent by weight of aluminum ortho-phosphate smaller than 200 mesh in particle size, approximately 1.72 percent by weight of silicon dioxide powder of 10 to 20 millimicrons in particle size, and approximately .21 percent by weight of aluminum powder of 15±5 micron diameter particle size; stirring said acid mixture to form a slurry; pouring said slurry into a lubricated mold; keeping said slurry containing mold at room temperature until it has foamed sufficiently to nearly fill said mold; and curing said foamed slurry at approximately 85 degrees until said slurry is cured.

15. A method of potting an electrical component by foamed-in-place ceramic refractory insulating material comprising the steps of: adding 39 to 60 percent by weight of phosphoric acid to a mixture of ingredients of 10 to 55 percent by weight of aluminum hydroxide, 0.7 to 4 percent by weight of bentonite, 0.1 to 0.5 percent by weight of a metal powder above hydrogen in the electrochemical series, up to 5 percent by weight of silicon dioxide, and aluminum phosphate in an amount necessary to bring the mixture to 100 percent by weight, said ingredients being of small particle size, stirring said mixture to form a slurry; placing said electrical component into a form; transferring said slurry into said form about said electrical component; allowing said slurry to foam for a short time in said form at room temperature; and curing said foamed slurry in said form at a temperature greater than approximately 65 to 100 degrees centigrade for two to twenty-four hours depending upon the curing temperature and volume of the mold.

16. The method of claim 15 wherein said phosphoric acid is approximately 85% concentrated, said aluminum hydroxide and said bentonite are of particle size of approximately 325 mesh or smaller, said metal powder is of particle size of approximately 15±5 microns, said silicon dioxide is of particle size of approximately 10 to 20 millimicrons, and said aluminum phosphate is of particle size of 150 mesh or smaller.

17. The method of claim 16 wherein the sum of said phosphoric acid and said aluminum hydroxide is 50 to 95 percent by weight.

18. A method of producing a foamed ceramic refractory insulating material comprising the steps of: adding 39 to 60 percent by weight of phosphoric acid to a mixture of ingredients of 10 to 55 percent by weight of aluminum hydroxide, 0.7 to 4 percent by weight of bentonite, 0.1 to 0.5 percent by weight of a powdered metal higher than hydrogen in the electrochemical series, and a percent by weight of aluminum phosphate to bring the percent by weight of the mixture up to about 100 percent, said ingredients being of small particle size; stirring said acid mixture to form a slurry; transferring a predetermined amount of said slurry into a given volume mold; allowing said slurry to foam; affixing a cover on said mold; and curing said foamed slurry at a temperature greater than approximately 65 degrees centigrade for twenty-four hours or less based on the curing temperature selected.

19. The method of claim 18 wherein said cover is removed after approximately one hour of curing time to bring about a reduced curing period.

20. The method of claim 18 wherein said foaming of said slurry is done at room temperature for about thirty minutes; wherein said mixture further includes silicon dioxide of up to .5 percent by weight.

21. The method of claim 20 wherein said phosphoric acid is approximately 85% concentrated, said aluminum hydroxide and said bentonite are of particle size of approximately 325 mesh or smaller, said powdered metal is aluminum powder of particle size of approximately 15±5 microns, said silicon dioxide is of particle size of approximately 10 to 20 millimicrons and said aluminum phosphate is of particle size of 150 mesh or smaller.

22. The method of claim 21 wherein the sum of said phosphoric acid and said aluminum hydroxide is 50 to 95 percent by weight and said mold is of a rigid construction.

References Cited
UNITED STATES PATENTS

| | | | |
|---|---|---|---|
| 1,873,014 | 8/1932 | Morgan. | |
| 1,931,795 | 10/1933 | Heilman. | |
| 2,161,290 | 6/1939 | Grimm et al. | |
| 2,455,758 | 12/1948 | Greger. | |
| 2,588,646 | 3/1952 | Miller et al. | |
| 2,868,294 | 1/1959 | Beale et al. | |
| 2,966,421 | 12/1960 | Zimmerman et al. | 106—40 |
| 2,992,930 | 7/1961 | Wheeler et al. | |
| 3,041,190 | 6/1962 | Griffith et al. | |
| 3,041,205 | 6/1962 | Iler. | |
| 3,223,537 | 12/1965 | Wiegert et al. | 106—40 |

TOBIAS E. LEVOW, *Primary Examiner.*

JAMES E. POER, *Examiner.*